United States Patent [19]
Fabre

[11] 3,795,363
[45] Mar. 5, 1974

[54] INDICATOR OF THE MAXIMUM TORQUE USABLE ON A HELICOPTER DRIVEN BY A TURBO-MOTOR

[75] Inventor: Paul Marie Esteve Henry Fabre, Bouches du Rhone, France

[73] Assignee: Societe Nationale Industrielle Aerospatiale, Paris, France

[22] Filed: Mar. 30, 1972

[21] Appl. No.: 239,419

[30] Foreign Application Priority Data
Apr. 7, 1971   France .............................. 71.12263

[52] U.S. Cl. .................................... 235/78, 235/88
[51] Int. Cl. ......................... G06c 3/00, G06c 27/00
[58] Field of Search ................. 235/88, 78, 89, 70 A

[56] References Cited
UNITED STATES PATENTS

| | | | |
|---|---|---|---|
| 3,259,311 | 7/1966 | Sama et al. ............................. | 235/78 |
| 3,443,750 | 5/1969 | Slavin et al. ........................... | 235/78 |
| 3,604,622 | 9/1971 | Yamada ............................... | 235/78 |

*Primary Examiner*—Stephen J. Tomsky
*Attorney, Agent, or Firm*—Karl W. Flocks

[57] ABSTRACT

A calculating instrument for determining the maximum torque output of a helicopter motor comprises a stationary part graduated in torque values, a moving part graduated in temperature values and a movable pointer.

1 Claim, 2 Drawing Figures

PATENTED MAR 5 1974         3,795,363

INDICATOR OF THE MAXIMUM TORQUE USABLE ON A HELICOPTER DRIVEN BY A TURBO-MOTOR

This invention relates to a maximum-torque indication system, of use in turbo-motor-driven helicopters.

In many such helicopters, the actual power output from the or each engine is measured by a torquemeter having a detector associated with the engine either via the transmission shaft between the engine and the reducer or actually in the reducer, and an indicator on the instrument panel tells the pilot the actual torque output of each turbomotor.

The usual practice in modern helicopters having turbomotors is for the same to be used below their maximum power, particularly at low altitude, so as to have a power reserve available at higher altitudes and in hot weather. Also, the transmission elements, more particularly the main reducer, are dimensioned for a rated power less than the maximum power of the or each turbomotor at low altitude, so that the transmission elements can be of very light weight. Most of the time, therefore, the transmission elements operate slightly below their rated power.

In addition to knowing the instantaneous torque output from the or each engine, the pilot must know what safety margin is left as regards the limitations of the or each engine and of the transmission elements, so that there is no chance of pilot action which might be dangerous due to occasional or systematic overshoot of the limitations, with the result either of permanent severe damage of the or each turbomotor due to overheating or of transmission overloads, leading to premature wear and failure of the transmission mechanisms.

In practice, therefore, there are two limits for engine torque. One, a fixed limit, depends on the transmission elements and is operative mainly at low altitude and in cold weather, while the other a variable limit, is a function of the turbomotor, is dependent on pressure and ambient temperature in all operating conditions of the helicopter and is normally lower than said fixed limit at high altitude or in hot weather, more particularly in a combination of high altitude and hot weather.

The fixed limit can readily be embodied in the form of a warning mark on the torque indicator, but the variable limits are usually to be found in charts which are contained in the flight manual and which are virtually useless to a pilot in flight.

Also known are torque indicators having provision for pressure and temperature correction by mechanical means comprising linkage and swivels. One such indicator is disclosed by French Patent Specification No. 1,559,082 in the name of Szydlowsky. A difficulty with such indicators is that they wear fairly rapidly and are affected by vibrations. Also, they are intended more particularly for supervising turbomotor operation with the aim of achieving maximum efficiency. Above all, they are of complicated construction since they make use of actual operating parameters and the limits of each such parameter.

It is also known for helicopters to have main-rotor pitch-limit indicators giving general indications of air temperature and density, the main calibration taking account of the weight of the aircraft and indirectly of the maximum torque which the transmission can deal with. Facilities of this kind give accurate and very useful indications for rotor pitch control but give no direct indications of the critical torque.

To obviate these disadvantages this invention relates to an automatic calculating facility from which the pilot can find out the critical torque which the turbomotor of his helicopter can provide at any particular instant of time.

The underlying idea of the invention is that the expression for the limit torque which a turbomotor can output is of course given by the approximate formula:
$C = p \cdot k \cdot f(t)$
in which $p$ denotes the absolute ambient pressure possibly expressed in altitude on the assumption of normal atmospheric pressure, $k$ denotes a constant and $f(t)$ denotes a transfer function which is connected with the ambient temperature $t$ and determined by the engine maker experimentally.

To this end, the calculating instrument according to the invention comprises: a stationary part graduated in torque values along a first line and in altitude/pressure values along a second line parallel to the first line; a moving part which on the one hand is graduated in temperature values and along a line parallel to the first two lines and which can be moved past the second of these lines; on the other hand a pointer movable along the first line, the various graduations being logarithmic.

In a construction of this kind, the parameters embodied are merely those of an approximate theoretical formula; however, since the object is just to determine a safety limit, the construction is much simpler than it would be if the margin of possibilities of the actual parameters determining available torque were used.

Preferably, the various graduated lines are circular and concentric and the instrument is in the form of a dial having two stationary concentric graduations and a moving annular part rigidly secured to a pointer moving past the graduation of the first line.

In an advantageous embodiment, of use for a portable instrument, the torque value which the transmission can handle is given the value 100 and the graduation of the instrument in torque values is in percentages of this rated torque value. The instrument can then be used for more than one helicopter since the constant $k$ and the function $f(t)$ are virtually the same for a variety of turbomotors.

The same feature can be used for an on-board construction; in this case the torque graduation is the graduation past which the actual-torque indicating needle moves, and the maximum permissible torque value pointer moves concentrically of the actual-torque needle.

An embodiment of the invention is shown in the accompanying drawings wherein.

Figure 1:
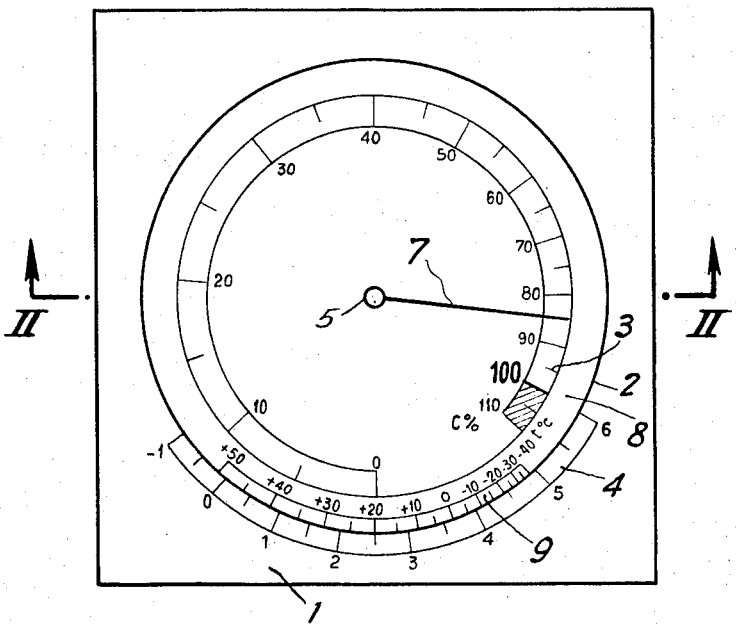
FIG. 1 is a front view of an instrument according to the invention.

In the embodiment shown, a plate 1 is formed with a circular groove 2 whose inner edge is marked with a graduation 3 and whose outer edge is marked with a graduation 4. Graduation 3 is a logarithmic graduation in percent, from zero to 110. The value 100, corresponding to the maximum torque which the transmission can handle, can be indicated by a special graphic number; another possibility is for the scale markings beyond 100 to be coloured e.g., red. Graduation 4 is a pressure graduation with altitude conversion to bring it to normal atmospheric pressure. In this event the graduation is in kilometres of altitude from −1 to 6.

A transparent disc 6 rotatable on a central pivot 5 is marked with a radial pointer 7 and is rigidly secured to an annular member 8 movable in groove 2. Member 8 has on its outside, opposite the altitude graduation, a temperature graduation 9 which extends from −40°C to +50°C in the example shown.

All graduations are logarithmic and the angular offset between the pointer 7 and each of the numbers of the graduation 9 represents the function $f(t)$ for the corresponding temperature number indicated.

According to the formula previously mentioned:

$\log C = \log f(t) + \log kp$

In practice the value of k is found by experiment to be of the order of 1/1000, e.g., 1/1013 in one actual example.

If the actual value of the outside ambient temperature (graduation 9) as read on any thermometer is placed opposite the actual-pressure value (graduation 4) as read on any barometer, in relation to the zero of the pressure graduation 4, the angular position of the pointer corresponds to the sum of the logarithm of the pressure (divided by $k$) and of the function $f(t)$ for the instantaneous value of $t$. The pointer 7 is therefore opposite the value (expressed in percent) of the maximum possible torque. If the latter is greater than 100, its value is limited by transmission strength; otherwise the true value of the maximum possible torque can be found by a simple calculation. This true value can also be marked on graduation 3.

Figure 2:
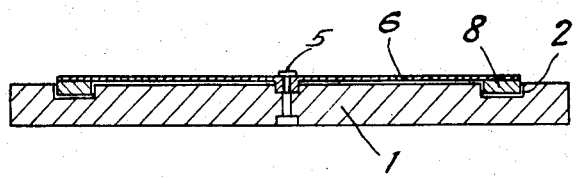
FIG. 2 is a section on the line II-II of FIG. 1.

To make all calculation superfluous, the device shown in FIGS. 1 and 2 can be made entirely of a transparent material and form the cover of the torque indicator; of course, the graduation 3 must be adapted to the graduation of the torque indicator. In this case the pointer 7 or the limit value 100 represent the limits within which the torque indicator pointer must remain.

The invention is of use for air navigation in a turbomotored helicopter, more particularly a single-engine helicopter, to reduce the risk of pilot error.

I claim:

1. On board a turbomotor driven helicopter, a calculating instrument for determining the limit value of the motor's maximum torque C according to the formula $$C = p \cdot k \cdot f(t)$$

$p$ being the value of the ambient pressure, $k$ a constant, and $f(t)$ a transfer function of the ambient temperature, comprising a circular stationary dial member having two concentric sectors of different radius, a first log scale graduated in torque value $C$ along the smaller of said radius sectors, a second log scale graduated in pressure $p$ multiplied by $k$ along the larger of said radius sectors and a circular groove between said sectors; and a rotating transparent disc coaxial with said larger radius sector having a circular rib engaging said groove and peripherally having a third log scale graduated in temperature $t$ and having thereon a pointer displaced in the movement of said disc along said first log scale, the angular distance of said pointer to each value of $t$ corresponding to $\log f(t)$.

* * * * *